United States Patent
Hoshino et al.

[11] Patent Number: 5,951,086
[45] Date of Patent: Sep. 14, 1999

[54] DETACHING MECHANISM FOR VEHICLE SEAT

[75] Inventors: Akihiko Hoshino, Kanagawa; Takashi Nakamori; Hideya Miyashita, both of Tokyo, all of Japan

[73] Assignee: Ikeda Bussan Co., Ltd., Ayase, Japan

[21] Appl. No.: 08/998,819

[22] Filed: Dec. 29, 1997

[30] Foreign Application Priority Data

Mar. 7, 1997 [JP] Japan ................................... 9-070650

[51] Int. Cl.⁶ ...................................................... B60N 2/08
[52] U.S. Cl. .................................. 296/65.03; 403/322.4; 403/322.1; 297/336
[58] Field of Search ...................... 296/65.03; 248/429; 403/322.1, 322.4, 321; 297/331, 335, 336

[56] References Cited

U.S. PATENT DOCUMENTS

| | | |
|---|---|---|
| 3,899,151 | 8/1975 | Kobrehel . |
| 4,773,693 | 9/1988 | Premji et al. ........................ 296/65.1 |
| 4,830,422 | 5/1989 | Levitre . |
| 4,978,097 | 12/1990 | Froutzis . |
| 5,562,322 | 10/1996 | Christoffel . |
| 5,711,505 | 1/1998 | Nemoto ................................. 297/331 |
| 5,765,894 | 6/1998 | Okazaki et al. ....................... 297/336 |
| 5,826,945 | 10/1998 | Siebler et al. . |

*Primary Examiner*—Anthony Knight
*Assistant Examiner*—Agatha Youmans
*Attorney, Agent, or Firm*—Foley & Lardner

[57] ABSTRACT

A lock mechanism comprises a latch claw installed on a fixed rail of a back and forth slide mechanism, and a lock release knob disposed between the latch claw and an operating lever for a lock release operation supported by a movable rail. An end portion of the operating lever is inserted into an inside of the back and forth slide mechanism from a through hole formed in the movable rail. The lock release knob is operated by the operating lever and an engagement between a striker disposed on a vehicle floor and the latch claw is released.

12 Claims, 5 Drawing Sheets

DETACHING MECHANISM FOR VEHICLE SEAT

BACKGROUND OF THE INVENTION

The present invention relates to a detaching mechanism for a vehicle seat and more specifically to a detaching mechanism comprising at-least one lock mechanism, disposed at either or both of front and rear positions under a seat between a vehicle floor and a fixed rail of a back and forth slide mechanism, for detaching either or both of the front and rear ends of the vehicle seat together with the fixed rail and a movable rail of the back and forth slide mechanism, from the vehicle floor by releasing said lock mechanism.

A conventional one box car used for carrying both passengers and luggage has seats and a space for carrying luggage. Except for a driver's seat and a front passenger seat, seats may be detachable type or movable type.

To increase the space for luggage or cargo, the seats are removed from the floor in case of the detachable type, or moved forward in case of the movable type. Some conventional examples are shown in Japanese Utility Model Provisional (Kokai) Publication No. 4 (1992)-131533 and Japanese Post-Examination (Kokoku) Publication No. 6 (1994)-11226. Japanese Patent Provisional (Kokai) Publication No. 63 (1988)-137054 shows another example including a single lever for pulling down a seat forward and detaching the seat. In an example shown in Japanese Patent Provisional (Kokai) Publication No. 6 (1994)305346, a seat is detached from a slide mechanism.

In case of a conventional detachable seat, as shown in FIGS. 5A, 5B and 6, a lock mechanism 11 is disposed between a back and forth slide mechanism 1 and a striker 9. The back and forth slide mechanism 1 comprises a fixed rail 3 and a movable slide rail 5. The striker 9 is fixed to a vehicle floor 7. The seat can be detached together with the back and forth slide mechanism 1 from the striker 9 by releasing the lock mechanism 11.

The lock mechanism 11 comprises a lock main body 13, a lock release knob 15 and a lock release operation lever unit 17. The lock main body 13 is attached to the fixed rail 3. The lock release knob 15 is provided on the lock main body 13. A latch claw 14 of the lock main body 13 engages with the U-shaped striker 9 projecting upward from the vehicle floor 7.

In the conventional detachable seat mechanism, the lock release knob 15 of the lock mechanism 11 projects in the lateral direction from the side of the lock main body 13 disposed under the fixed rail 3 of the back and forth slide mechanism 1, so that the lock mechanism requires a wider space along the lateral direction. Furthermore, the conventional mechanism requires a protector 19 for covering the laterally projecting lock release knob 15. This deteriorates the appearance, increases the number of component parts and the number of manufacturing steps, complicates the assemblage, and increases the cost.

SUMMARY OF THE INVENTION

It is an object of the present invention to provide a detaching mechanism for a vehicle seat capable of saving a space by receiving a lock release knob of a lock mechanism into an inside of a back and forth slide mechanism, decreasing the number of parts by disusing a protector covering the lock release knob, improving an appearance, making the assemblage easy, and improving a space efficiency for luggage.

According to the present invention, a detaching mechanism for a vehicle seat comprises:

a slide mechanism for adjusting a position of the vehicle seat back and forth, said slide mechanism comprising a fixed rail and a movable rail for supporting the seat and sliding on said fixed rail;

a lock mechanism for fixing said fixed rail to a vehicle floor and allowing removal of said slide mechanism from the floor; and an operating lever, pivotally supported on said slide rail, for moving said lock mechanism from a lock state for fixing said fixed rail to the vehicle floor to an unlock state for allowing said slide mechanism to be removed from the floor;

wherein said lock mechanism comprises a latch claw, provided on the fixed rail, for engaging with a striker provided on the vehicle floor, and a lock release knob provided between said latch claw and said operating lever;

wherein said movable rail is formed with a through hole, and said operating lever comprises an end portion for moving the lock release knob in a release direction to disengage the latch claw from the striker, said end portion of said operating lever being inserted into an inside of the slide mechanism through said through hole of said movable rail.

According to one embodiment of the present invention, the operating lever is pivotally supported on an upper surface of said movable rail and the end portion of the operating lever is inserted into the inside of the slide mechanism from the through hole formed in the upper surface of the movable rail and the lock release knob is inserted into the inside of the slide mechanism from a through hole formed in a lower portion of the fixed rail.

DETAILED DESCRIPTION OF THE INVENTION

Figure 1:
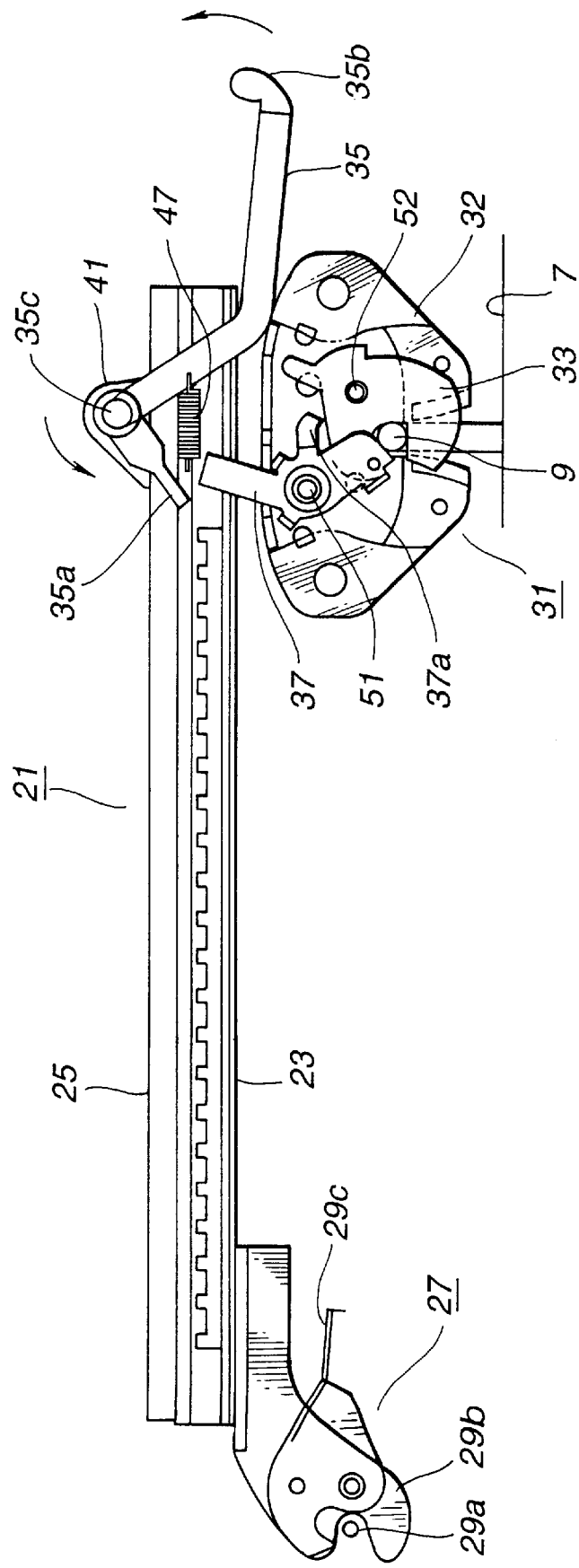
FIG. 1 is a side view of a back and forth slide mechanism and a lock mechanism showing a detaching mechanism for a vehicle seat according to one embodiment of the present invention.

An embodiment of the present invention is shown in FIGS. 1 through 4. In FIG. 1, a back and forth slide mechanism 21 is shown. The back and forth slide mechanism 21 comprises a pair (left and right) of fixed rails 23 and a pair (left and right) of movable rails 25. The fixed rails 23 extend from a front portion to a rear portion of a vehicle floor 7. The movable rails 25 are slidably fitted with the fixed rails 23. A seat cushion for the vehicle seat is mounted on the movable rails 25. The seat cushion may be detachably mounted on the movable rails 25.

In this embodiment, a front lock mechanism 27 and a rear lock mechanism 31 are respectively disposed at front and rear positions between the vehicle floor 7 and the fixed rail 23 on each side. These front and rear lock mechanisms make the seat detachable. However, the present invention is applicable to such a lift type seat that the front or rear end of the vehicle seat is lifted from the vehicle floor 7 together with the fixed rails 23 and movable rails 25.

The left and right front lock mechanisms 27 are provided on the front side of the left and right fixed rails 23, and the left and right rear lock mechanisms 31 are provided on the rear side of the left and right fixed rails 23. In each front lock mechanism 27 of this example, an engaging piece 29b is engaged with an engaging member 29a disposed in the front portion of the vehicle floor 7. The lock condition of the engaging piece 29b is released by operating a front lock release lever 29c.

The rear lock mechanism 31 on each side comprises a lock main body 32. A latch claw 33 is installed on a lower portion of the lock main body 32. The latch claw 33 engages with a striker 9 provided on the vehicle floor 7. An operating lever 35 extends between the left and right rear lock mechanisms 31. The both sides of the operating lever 35 are supported by the left and right movable rails 25. The operating lever 35 is substantially U-shaped and is used for a lock release operation. Each rear lock mechanism 31 further comprises a lock release knob 37. The lock release knob 37 is provided between said latch claw 33 and the operating lever 35.

Figure 2:
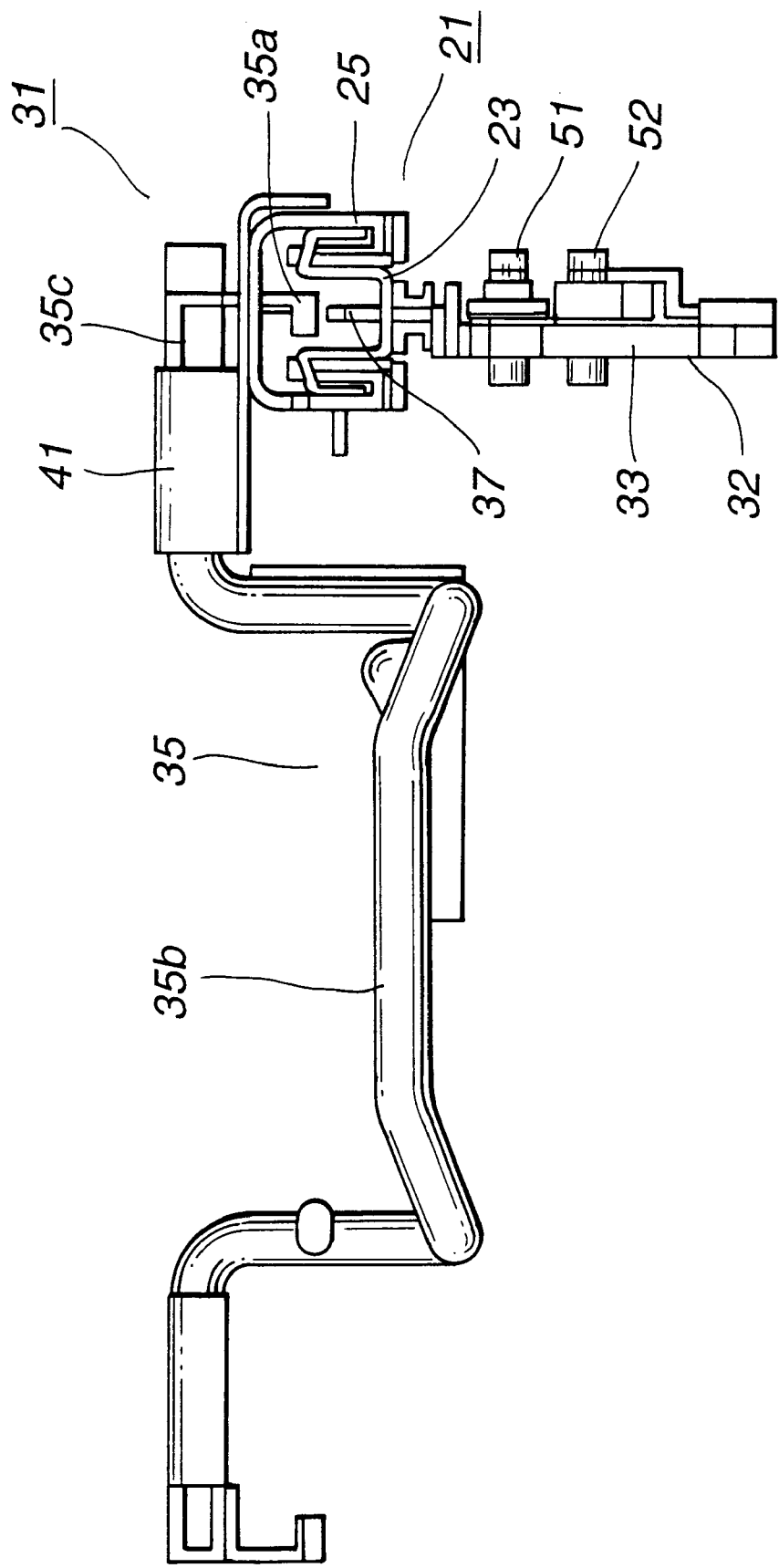
FIG. 2 is a front view of the back and forth slide mechanism and the lock mechanism shown in FIG. 1.

The operating lever 35 comprises left and right end portions 35a for a lock release operation and a substantially U-shaped intermediate operating portion 35b, as shown in FIG. 2. A crank portion 35c is formed between each end portion 35a and the operating portion 35b. These crank portions 35c are rotatably supported by brackets 41 respectively. The brackets 41 are provided on the upper surfaces 25a of the left and right movable rails 25. The end portion 35a of the operating lever 35 on each side is inserted into the inside of the back and forth slide mechanism 21 from an upper through hole 43 formed in the upper surface 25a of the movable rail 25. The lock release knob 37 on each side is inserted into the inside of the back and forth slide mechanism 21 from a lower through hole 45 formed in a bottom of the fixed rail 23.

A resilient spring 47 shown in FIG. 1 urges the operating lever 35 to a lock position in which the lock release knob 37 is not operated. In this state, the latch claw 33 is urged to a locking direction. The lock release knob 37 is rotatable on a pin 51. The latch claw 33 is rotatable on a pin 52.

When the operating lever 35 is in the lock position, the lock release knob 37 on each side projects upwardly. However, even if the movable rail 25 slides from the frontmost position to the rearmost position, the lock release knob 37 does not interfere with the end portion 35a of the operating lever 35.

Figure 3:
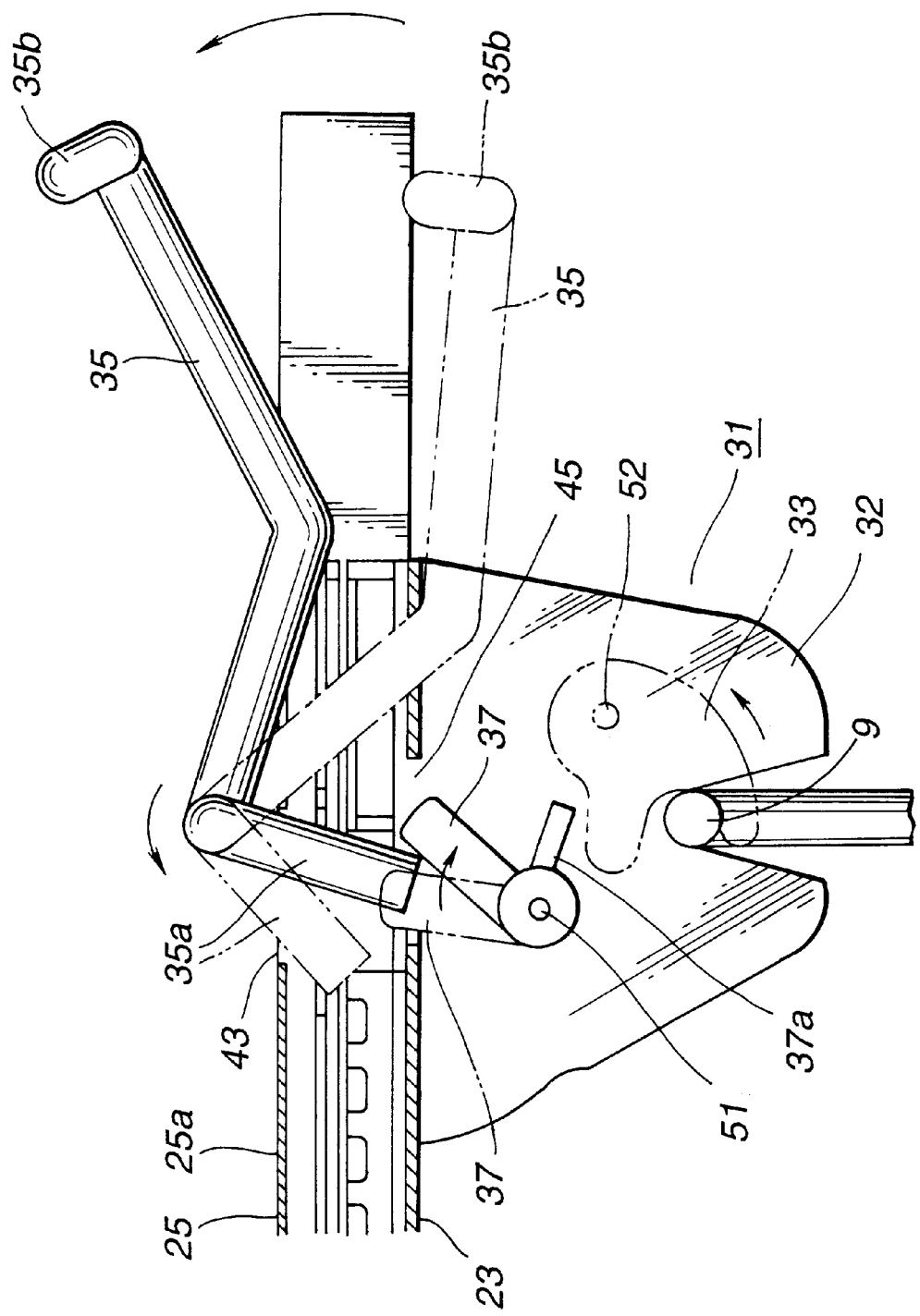
FIG. 3 is a partially enlarged side view showing a lock release state of the lock mechanism of the detaching mechanism of FIG. 1.
Figure 4:
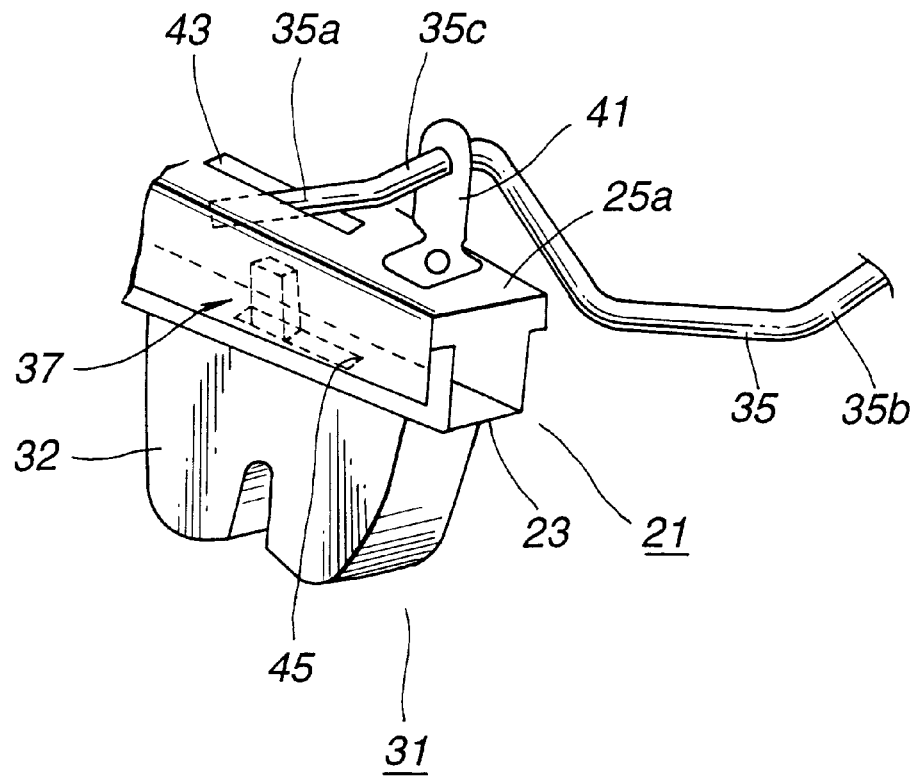
FIG. 4 is a perspective view roughly showing the detaching mechanism of FIG. 1.
Figure 6:
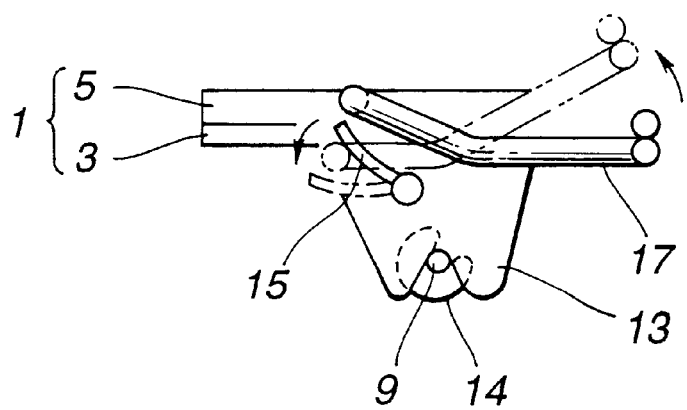
FIG. 6 is a schematic side view showing the conventional lock mechanism of the detaching mechanism of FIG. 5A.
Figure 5A:
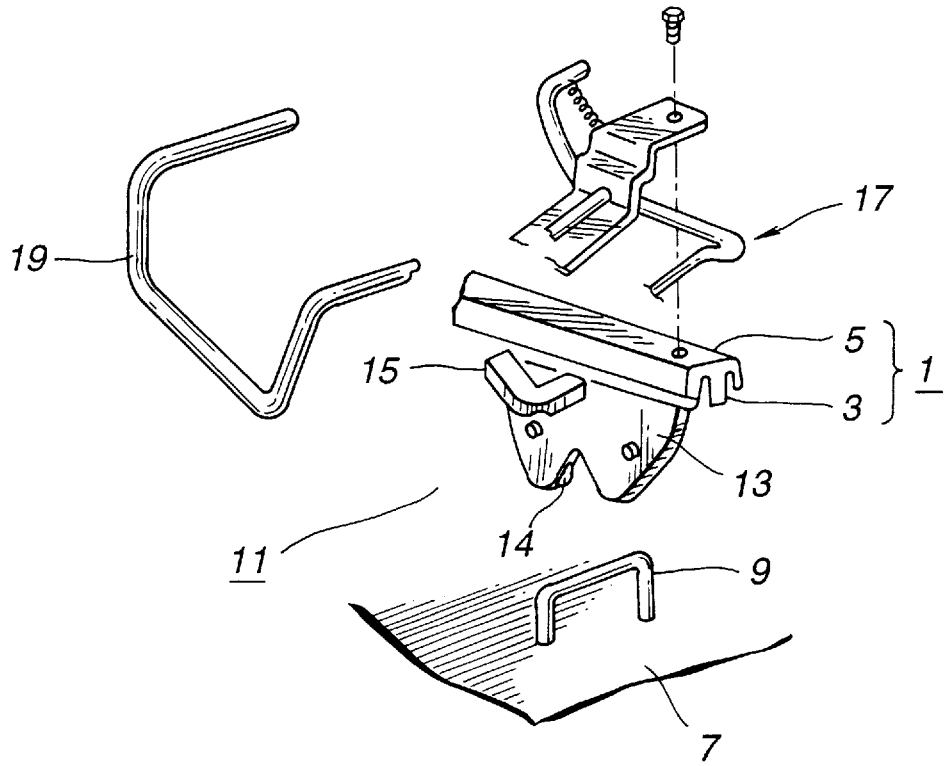
FIG. 5A is an exploded perspective view showing a conventional lock mechanism of a detaching mechanism for a vehicle eat.
Figure 5B:
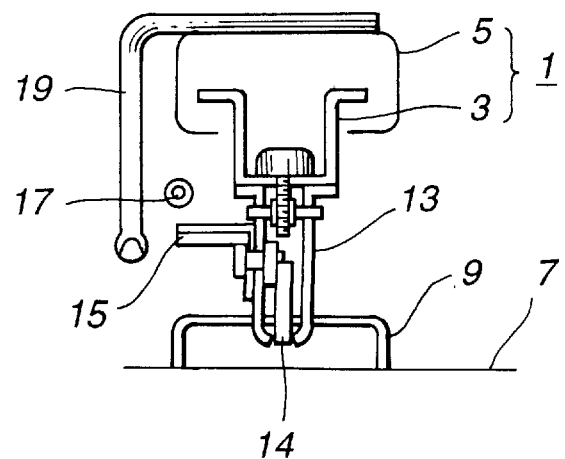
FIG. 5B is a side view showing the conventional lock mechanism of the detaching mechanism of FIG. 5A.

As shown in FIG. 3, when the operating portion 35b of the operating lever 35 is rotated counterclockwise, the left and right lock release knobs 37 are rotated clockwise together, and an operation arm 37a of the lock release knob 37 on each side rotates the latch claw 33 counterclockwise. The left and right latch claws 33 are released from the strikers 9 simultaneously.

According to a detaching mechanism for a vehicle seat, a lock mechanism comprises a latch claw disposed on a fixed rail side of a back and forth slide mechanism engaged with a striker installed on a vehicle floor, a lock release operating lever pivotally supported by a movable rail and a lock release knob disposed between said latch claw and said operating lever. Because the end portion of the lock release operation side of said operating lever is inserted into the inside of the back and forth slide mechanism from a through hole formed in the movable rail and the lock release knob is operated by said operating lever and the engagement between said striker and said latch claw is released, the lock release knob of the lock mechanism does not project from the side of a lock main body disposed on a lower portion of the fixed rail of the slide mechanism and it is not necessary to maintain an extra space expanding to a horizontal direction and a protector covering the lock release knob is not necessary, thereby there is no possibility to worsen an appearance. Because the latch claw is disposed on a lower portion of the fixed rail, a torsion is not produced on the latch claw and it is possible to transmit the load from a vehicle seat to a vehicle floor efficiently.

According to the illustrated embodiment, a lock mechanism comprises a latch claw disposed on a fixed rail side of a back and forth slide mechanism engaged with a striker installed on a vehicle floor, a lock release operation operating lever pivotally supported by a movable rail and a lock release knob disposed between said latch claw and said operating lever. Because said operating lever is supported on the upper surface of the movable rail and the end portion of the lock release operation side of the operating lever is inserted into the back and forth slide mechanism from a through hole formed in the upper surface of the movable rail and said lock release knob is inserted into the inside of the back and forth slide mechanism from a through hole formed in a lower portion of the fixed rail of the back and forth slide mechanism and the lock release knob is operated by said operating lever and the engagement between said striker and said latch claw is released, the lock release knob of the lock mechanism does not project from the side of the lock main body disposed on a lower portion of the fixed rail of the back and forth slide mechanism and it is not necessary to maintain an extra space expanding to a horizontal direction and a protector covering the lock release knob is not necessary, thereby there is no possibility to worsen an appearance. Because the latch claw is disposed on a lower portion of the fixed rail, a torsion is not produced on the latch claw and it is possible to transmit the load from a vehicle seat to a vehicle floor efficiently.

A detaching mechanism for a vehicle seat according to the present invention can save a space by containing a lock release knob of a lock mechanism in the inside of a back and forth slide mechanism, reduce the number of parts by disusing a protector covering the lock release knob, improve the appearance, facilitate the assemblage, and improve a space efficiency of luggage.

According to the present invention, it is possible to construct a vehicle body structure in the following manner. The vehicle body structure comprises a vehicle floor member defining a floor of a passenger compartment, and at least one seat structure mounted on the vehicle floor. The seat structure comprises a slide mechanism for adjusting a position of the vehicle seat back and forth, and a lock mechanism for fixing the slide mechanism to the vehicle floor and allowing removal of the slide mechanism from the floor member. The slide mechanism comprises a fixed rail and a movable slide rail for supporting the seat slidably. The lock mechanism is designed to fix the fixed rail to the floor member. The seat structure further comprises an operating lever, pivotally mounted on the slide rail, for moving the lock mechanism from a lock state for fixing the fixed rail to the floor member to an unlock state for allowing the slide mechanism to be removed from the floor member.

The lock mechanism comprises a latch claw and a lock release knob. In one example, the latch claw is swingably mounted on a main body member fixed to the fixed rail, and arranged to engage with a striker fixed to the vehicle floor member. The lock release knob is provided between the latch claw and the operating lever.

The movable rail is formed with a through hole, and the operating lever comprises an end portion for moving the lock release knob in a release direction to disengage the latch claw from the striker. The end portion of the operating lever extends into the inside of the slide mechanism through the through hole of the movable rail.

In one example, the movable rail comprises an upper (horizontal) wall section, an inner vertical wall section extending downward from an inner side of the upper wall section, and an outer vertical wall section extending downward from an outer side of the upper wall section. The through hole is formed in the upper wall section of the movable rail. The end portion of the operating lever extends into the inside between the inner and outer wall sections through the through hole formed in the upper wall section. The fixed rail comprises a lower (horizontal) wall section, an inner vertical wall section extending upward from an inner side of the lower wall section, and an outer vertical wall section extending upward from an outer side of the lower wall section. A through hole is formed in the lower wall section of the fixed rail. The release knob extends into the inside of the fixed rail between the inner and outer wall sections through the through hole formed in the lower wall section. In the illustrated example, the inner and outer wall sections of the fixed rail are received between the inner and outer wall sections of the slide rail. The main body member is fixed to the fixed rail, and extends downward from the lower wall section. The striker is fixed to the floor member and projects upward from the floor member.

The release knob and the latch claw are both swingably mounted on the main member. The swing axes of the release knob and latch claw are parallel to each other, and both extend along a transverse direction which is perpendicular to a longitudinal direction along which the rails extend. The swing axis about which the end portion of the operating lever swings also extends along the transverse direction. The position of the swing axis for the end portion of the operating lever is higher than the position of the swing axis of the release knob. The position of the swing axis of the latch claw is lower than the swing axis position of the release knob. In the example of FIG. 3, the operating lever 35 is urged in the clockwise direction by the springs 47. In one example, the release knob 37 is urged in the counterclockwise direction by a spring, and the latch claw 33 is urged in the clockwise direction by a spring.

What is claimed is:

1. A detaching mechanism for a vehicle seat comprising:
    a slide mechanism for adjusting a position of the vehicle seat back and forth, said slide mechanism comprising a fixed rail and a movable rail for supporting the seat and sliding on said fixed rail;
    a lock mechanism for fixing said fixed rail to a vehicle floor and allowing removal of said slide mechanism from the floor; and
    an operating lever, pivotally supported on said slide rail, for moving said lock mechanism from a lock state for fixing said fixed rail to the vehicle floor to an unlock state for allowing said slide mechanism to be removed from the floor;
    wherein said lock mechanism comprises a latch claw, provided on the fixed rail, for engaging with a striker provided on the vehicle floor, and a lock release knob provided between said latch claw and said operating lever;
    wherein said movable rail is formed with a first through hole, and said operating lever comprises an end portion for moving the lock release knob in a release direction to disengage the latch claw from the striker, said end portion of said operating lever being inserted into an inside of the slide mechanism through said through hole of said movable rail.

2. A detaching mechanism as claimed in claim 1 wherein said operating lever is pivotally supported on an upper surface of said movable rail, the end portion of the operating lever is inserted into the inside of the slide mechanism from the first through hole which is formed in the upper surface of the movable rail, and the lock release knob is inserted into the inside of the slide mechanism from a second through hole formed in a bottom of the fixed rail.

3. A detaching mechanism as claimed in claim 2 wherein said lock mechanism comprises a lock main body fixed to said fixed rail, and said lock release knob and said latch claw are swingably supported on said lock main body.

4. A detaching mechanism as claimed in claim 3 wherein said slide mechanism comprises left and right rail pairs each of which comprises said fixed rail and said movable rail, said lock mechanism comprises a left lock mechanism for the left rail pair and a right lock mechanism for the right rail pair, and each of said left and right lock mechanisms comprises said latch claw, said lock release knob and said lock main body.

5. A detaching mechanism as claimed in claim 4 wherein, in each rail pair, said fixed rail extends from a front position to a rear position of the vehicle floor and said movable rail is slidably mounted on said fixed rail, and wherein said left and right lock mechanisms are disposed at one of front and rear positions of said slide mechanism.

6. A detaching mechanism as claimed in claim 5 wherein said operating lever comprises another end portion, one of said end portions of said operating lever is a left end portion for extending through the first through hole formed in said movable rail of the left rail pair and moving the lock release knob of the left lock mechanism, the other of said end portions is a right end portion for extending through the first through hole formed in said movable rail of the right rail pair and moving the lock release knob of the right lock mechanism, and said operating lever further comprises an intermediate portion extending between the left and right end portions.

7. A detaching mechanism as claimed in claim 6 wherein the operating lever further comprises a left crank portion between the left end portion and the intermediate portion and a right crank portion between the right end portion and the intermediate portion, said left crank portion is rotatably mounted on a left bracket fixedly mounted on the upper surface of the movable rail of the left rail pair, and said right crank portion is rotatably mounted on a right bracket fixedly mounted on the upper surface of the movable rail of the right rail pair.

8. A detaching mechanism as claimed in claim 3 wherein the release knob and the latch claw are both swingably mounted on the main body, swing axes of the release knob and latch claw are parallel to each other, and both extend along a transverse direction which is perpendicular to a longitudinal direction along which the rails extend, and a swing axis about which the end portion of the operating lever swings also extends along the transverse direction.

9. A detaching mechanism as claimed in claim 8 wherein a position of the swing axis for the end portion of the operating lever is higher than a position of the swing axis of the release knob, a position of the swing axis of the latch claw is lower than the position of the swing axis of the release knob.

10. A detaching mechanism as claimed in claim 1 wherein said movable rail comprises an upper wall section, an inner wall section extending downward from an inner side of the upper wall section, and an outer wall section extending downward from an outer side of the upper wall section, the first through hole is formed in the upper wall section of the movable rail, the end portion of the operating lever extends into an inside of the movable rail between the inner and outer wall sections through the first through hole formed in the upper wall section.

11. A detaching mechanism as claimed in claim 6 wherein the fixed rail comprises a lower wall section, an inner upright wall section extending upward from an inner side of the lower wall section, and an outer upright wall section extending upward from an outer side of the lower wall section, a second through hole is formed in the lower wall section of the fixed rail, the release knob extends into an inside of the fixed rail between the inner and outer wall sections of the fixed rail through the second through hole formed in the lower wall section of the fixed rail.

12. A detaching mechanism as claimed in claim 1 wherein said lock mechanism is a first lock mechanism, said detaching mechanism further comprises a second lock mechanism, one of said first and second lock mechanisms is a front lock mechanism for fixing a front portion of said fixed rail to the vehicle floor, and the other of said first and second lock mechanisms is a rear lock mechanism for fixing a rear portion of said fixed rail to the vehicle floor.

* * * * *